(12) United States Patent  (10) Patent No.: US 8,221,627 B2
Staton et al.  (45) Date of Patent: Jul. 17, 2012

(54) NITRIFICATION AND DENITRIFICATION OF DIGESTED BIOSOLIDS

(75) Inventors: Kevin L. Staton, West Lafayette, IN (US); Jim Eloff, Lafayette, IN (US); Richard L. Pressley, Crown Point, IN (US)

(73) Assignee: Thermal Process Systems, LLC, Crown Point, IN (US)

( * ) Notice: Subject to any disclaimer, the term of this patent is extended or adjusted under 35 U.S.C. 154(b) by 384 days.

(21) Appl. No.: 12/471,657

(22) Filed: May 26, 2009

(65) Prior Publication Data

US 2010/0044318 A1 Feb. 25, 2010

Related U.S. Application Data

(60) Provisional application No. 61/055,706, filed on May 23, 2008.

(51) Int. Cl.
*C02F 3/00* (2006.01)
(52) U.S. Cl. ......... 210/609; 210/620; 210/739; 210/743
(58) Field of Classification Search ................. 210/609, 210/620, 739, 743
See application file for complete search history.

(56) References Cited

U.S. PATENT DOCUMENTS

| 5,811,009 | A | 9/1998 | Kos | |
|---|---|---|---|---|
| 6,719,903 | B1 | 4/2004 | Pressley | |
| 7,833,415 | B2* | 11/2010 | Murthy et al. | 210/605 |
| 2003/0085171 | A1 | 5/2003 | Khudenko | |
| 2005/0145566 | A1* | 7/2005 | Haase et al. | 210/620 |
| 2006/0011540 | A1* | 1/2006 | Pressley et al. | 210/613 |

OTHER PUBLICATIONS

PCT International Searching Authority, Notification of Transmittal of the International Search Report and the Written Opinion, in PCT/US2009/045135, dated Jul. 13, 2009.
PCT International Searching Authority, Notification Concerning Transmittal of International Preliminary Report on Patentabiltiy, in PCT/US2009/045135, dated Dec. 2, 2010.

* cited by examiner

*Primary Examiner* — Chester Barry
(74) *Attorney, Agent, or Firm* — Neal, Gerber & Eisenberg LLP

(57) ABSTRACT

Processes and apparatus are provided for the nitrification and denitrification of digested biosolids. The rate of nitrification/denitrification is controlled by sensing the amount of oxygen or another parameter in the digested biosolids and adjusting the amount of oxygen supplied to the biosolids, such as through automated adjustment of an aeration device. To promote nitrification, the amount of oxygen available in the digested biosolids is increased. To promote denitrification, the amount of oxygen available in the digested biosolids is decreased. The processes and apparatus are well suited for reducing the concentration of ammonium in biosolids or off-gas resulting from aerobic thermophilic digestion of wastewater sludges. The processes and apparatus are well suited for reducing the dosage of chemicals required for dewatering operations of biosolids.

22 Claims, 6 Drawing Sheets

NITRIFICATION AND DENITRIFICATION OF DIGESTED BIOSOLIDS

CROSS-REFERENCE TO RELATED APPLICATIONS

The present application claims the priority of U.S. Provisional Application No. 61/055,706, filed May 23, 2008, which is incorporated by reference herein.

FIELD OF THE INVENTION

The present processes and apparatus relate to nitrification and denitrification of thermophilically digested biosolids. Nitrification and denitrification are promoted and controlled in an automated system. The processes and apparatus are well suited for reducing ammonia in biosolids resulting from aerobic thermophilic digestion of wastewater sludges.

BACKGROUND OF THE INVENTION

Wastewater material may be settled out without treatment and is termed as primary sludge or may be treated by another process and is typically termed as secondary sludge. Collectively the term "sludge" is used for the material generated from wastewater treatment processes. The term "biosolids" is used for sludge that is further treated. Wastewater such as sewage streams generally contains various naturally occurring and/or man-made contaminants, notably organic contaminants. Some naturally occurring microorganisms have the ability to consume these contaminants for their own life processes, thereby turning an undesirable pollutant into (for their purposes) a beneficial nutrient or food source. The wastewater treatment industry frequently capitalizes on the ability of these microorganisms by using such microorganisms in facilities that treat wastewater streams to destroy the contaminants and break them down into basic compounds. Wastewater streams are fed into tanks and ponds that maintain conditions conducive to microorganism activity. Typically, the microorganisms that consume the target contaminants are mesophilic and thrive at temperatures in the range of about 15 to about 45 degrees Celsius.

The desired result of this type of wastewater treatment is the destruction of organic contaminants, but another result of this type of treatment is the production or increase of sludge, which includes these microorganisms. Although the sludge yielded from wastewater treatment operations can range from 0.1 pound of sludge per pound of biochemical oxygen demand (BOD) removed to about 1 pound of sludge per pound of BOD removed, a more typical range of sludge yield is from about 0.3 pounds to about 0.6 pounds of sludge per pound of BOD removed. Disposal of the sludge may still be problematic, even after many contaminants have been consumed by microorganisms. One problem arises from the human pathogenic nature of many microorganisms, such as the Fecal Coliform group of organisms. Although some microorganisms can be beneficial in consuming contaminants, they themselves pose a danger to human health and are disease-causing organisms. These include, but are not limited to, certain bacteria, protozoa, viruses and viable heimenth ova. Regulations by states, counties, cities, and/or the federal government often impose restrictions upon land disposal of material containing pathogenic microorganisms. It is desirable to treat sludge so that one can easily and legally dispose of the treated sludge now termed biosolids on land or under ground. Suitably treated biosolids may even prove to have beneficial uses. Under certain circumstances, biosolids may be used a soil conditioner or fertilizer similar to compost material.

Sludge also contains other materials including microorganisms which are not pathogenic in nature. Typically the sludge includes a group of microorganisms that thrive in what is generally referred to as the thermophilic temperature range, temperatures greater then 45 degrees Celsius. The thermophilic microorganisms are normally not harmful to humans, and there exists both aerobic and anaerobic bacteria that thrive within the thermophilic range. Thermophilic activity usually takes place within the range from about 45 degrees Celsius to about 75 degrees Celsius. In contrast, pathogenic bacteria usually thrive within a more narrow mesophilic range, which is from about 25 degrees Celsius to about 37 degrees Celsius, or the normal body temperature of humans. Some of these organisms may begin to die at about 38 degrees Celsius.

Various methods have been proposed and practiced for treating the sludge resulting from treatment of wastewaters. This sludge may be digested aerobically or anaerobically, with different microorganisms (biologically), as well as chemically, and/or physically. Sludge can also be thermophilically digested. Among the methods available for sludge treatment is autothermal thermophilic aerobic digestion (ATAD). ATAD capitalizes on the presence of materials in the sludge, such as naturally occurring microorganisms, which are not pathogenic or harmful to humans. Additionally, operations at these high temperatures inactivate the pathogenic microorganisms. Additional information regarding ATAD treatment of sludge is available in U.S. Pat. Nos. 5,948,261, 6,168,717, 6,203,701, 6,514,411 and 6,719,903 (assigned to Thermal Process Systems, LLC, of Crown Point, Ind.). An exemplary ATAD system is the ThermAer™ system available from Thermal Process Systems.

In a typical ATAD process, sludge resulting from wastewater treatment is aerobically and thermophilically digested in a reactor, which has sufficient oxygen available for aerobic microorganisms. The reactor operates at a temperature in the thermophilic range from about 45 degrees Celsius to about 75 degrees Celsius and even higher. Within this temperature range, thermophilic microorganisms are active, in an aerobic process where they utilize oxygen, for respiration, as they assimilate these contaminates.

The digestion of sludge, either aerobically or anaerobically, causes the mesophilic bacteria to break down, thereby generating certain byproducts when the protoplasm, from within the bacterial cells, is released into the biosolids. One of these byproducts is nitrogen which quickly converts to ammonia. Ammonia raises the pH of the digesting biosolids and may cause odors. Other byproducts include biopolymers, proteins, polysaccharides, and volatile fatty acids (VFAs). Higher concentrations of any of these byproducts often result in higher requirements of chemical conditioners and polymers for dewatering. It is thus desirable to have some way to reduce the amount of these byproducts.

To reduce these byproducts, various methods have been proposed and practiced for the conditioning of digested biosolids, including composting, anaerobic digestion, irradiation, pasteurization and drying. There are various concerns and disadvantages for each of these approaches for treating the byproducts, such as energy and chemical costs.

In addition, nitrification and denitrification steps have been used to treat wastewater, but their application to the treatment of digested biosolids has been limited. Existing nitrification and denitrification processes, for the post-digestion treatment of biosolids, have relied on the addition of large amounts of supplemental alkalinity, usually lime.

A major challenge in the conditioning of digested biosolids is that the temperature of the digested biosolids is typically from about 45 degrees Celsius to about 75 degrees Celsius, and therefore the digested biosolids must be cooled for conditioning. This is due to the mesophilic nature of the nitrifying and denitrifying microorganisms, which are optimized near but inhibited above approximately 40 degrees Celsius. Existing approaches for controlling and regulating the temperature of the conditioning tanks include the use of heat exchangers or natural convection.

There is a need for a nitrification/denitrification process for digested biosolids that is controllable, cost-efficient, and capable of alternating nitrification and denitrification phases in the same reactor. There is also a need for a nitrification/denitrification process for digested biosolids that does not rely on the addition of alkaline compounds such as lime.

BRIEF SUMMARY OF THE INVENTION

New processes and apparatus are provided for nitrification and denitrification of digested biosolids. In various embodiments of the present processes and apparatus, one or more parameters relevant to conditioning the biosolids are measured, such as dissolved oxygen (DO), pH, temperature, oxidation-reduction potential (ORP), and/or other parameters, and the oxygen content in the biosolids is adjusted based on the measured parameters. Also in various embodiments, novel techniques of temperature control and off-gas management are employed.

As one aspect of the present processes and apparatus, nitrification/denitrification processes are provided for treating digested biosolids. Digested biosolids (which include one or more undesirable digestion byproducts) are mixed with an oxygen-containing fluid. One or more parameters in the digested biosolids are measured. The parameters may be selected from the group consisting of pH, temperature, ORP, or other parameters indicative of dissolved oxygen. Based on the measured parameter, the mixing of the digested biosolids with the oxygen-containing mixed liquor suspended solids (MLSS) is adjusted, to promote nitrification or denitrification of the biosolids (including slowing or halting the flow of the oxygen-containing MLSS). An amount or a concentration of one or more digestion byproduct in the digested biosolids is reduced, thereby providing a conditioned biosolids end product.

In another aspect of the present processes and apparatus, processes are provided for treating digested biosolids, so as to reduce one or more byproducts of digestion. The processes comprise introducing digested biosolids into a storage nitrification/denitrification reactor (SNDR). An oxygen content is provided in the digested biosolids to promote nitrification of ammonia within the biosolids in the reactor. After a measured parameter reaches a desired threshold, the oxygen content can be adjusted (preferably in automated fashion) to promote denitrification of nitrates and nitrites within the biosolids in the reactor. The reduction in concentration of one or more digestion byproducts in the digested biosolids provides a conditioned biosolids product.

In yet another aspect of the present processes and apparatus, processes are provided for treating sludge produced by the treatment of wastewater. The processes comprise thermophilically digesting biosolids, then promoting nitrification and denitrification in the digested biosolids without the addition of an alkaline composition (such as lime) to the digested biosolids.

In another aspect of the present processes and apparatus, processes are provided for treating sludge produced by the treatment of wastewater. Sludge is digested (perhaps in an earlier reactor), and then the digested biosolids are transferred into the SNDR. Typically the biosolids are cooled by transferring through a heat exchanger and/or by spraying into the headspace of a storage nitrification/denitrification reactor, above the level of any liquid in the reactor. Nitrification and denitrification of the digested biosolids are promoted in the reactor.

In the processes and apparatus described herein, oxygen availability (in the form or O2, NO2, or NO3) of the biosolids can be cycled one or more times between a nitrification level (a level that promotes nitrification significantly over denitrification) and a denitrification level (a level that promotes denitrification significantly over nitrification) or through simultaneous nitrification/denitrifation. Alternatively the processes can include cycling two or more times between a nitrification phase and a denitrification phase, which may occur in the same reactor.

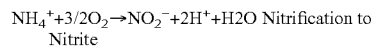
$NH_4^+ + 3/2O_2 \rightarrow NO_2^- + 2H^+ + H_2O$ Nitrification to Nitrite

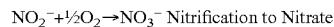
$NO_2^- + \frac{1}{2}O_2 \rightarrow NO_3^-$ Nitrification to Nitrate

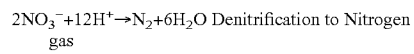
$2NO_3^- + 12H^+ \rightarrow N_2 + 6H_2O$ Denitrification to Nitrogen gas In the processes and apparatus described herein, one or more parameters (such as pH, ORP, DO, and/or temperature) can be continuously measured, so that the pH, ORP, DO and/or temperature of the digested biosolids can be continuously and automatically monitored by a programmable logic controller (PLC). One or more sensors located in the SNDR can be used to measure or monitor one or more parameters.

In the present processes and apparatus, oxygen content in the digested biosolids can be adjusted by increasing the supply of oxygen-containing fluid to promote nitrification of the digested biosolids. For example, the supply of oxygen-containing fluid can be increased when an upper pH threshold or a lower ORP threshold is detected as the monitored parameter. Preferably the upper pH threshold is in the range of from about 6.7 to about 7.2 depending on water chemistry. Alternatively, oxygen content in the digested biosolids can be adjusted by decreasing the supply of oxygen-containing fluid to promote denitrification of the digested biosolids. For example, the supply of oxygen-containing fluid can be decreased when a lower pH threshold or a higher ORP threshold is detected. Preferably the lower pH threshold is in the range of from about 6.4 to about 6.8, again dependent on local water chemistry conditions.

In the present processes and apparatus, the digested biosolids can be subjected to nitrification and denitrification without addition of an alkaline composition. For example, the ammonia/ammonium concentration can be reduced by as much as 70% without the addition of lime material.

In another aspect of the present processes and apparatus, apparatus are provided for the nitrification/denitrification of digested biosolids. The apparatus includes a reactor adapted for nitrification and denitrification of digested biosolids. The apparatus also includes one or more sensors adapted to measure one or more parameters of contents of the reactor. A single sensor can measure more than one parameter, or separate sensors can be provided to measure various parameters. The parameters may be selected from the group consisting of pH, temperature, or a parameter indicative of oxygen availability in the digested biosolids (such as DO or ORP). The apparatus also includes an aeration system at least partially within the reactor. The aeration system is configured to supply an oxygen-containing fluid to the reactor. The apparatus also includes a controller operatively connected to the sensor and to the aeration system. The controller can be adapted for adjusting the aeration system based upon a signal from the sensor.

In a further aspect of the present processes and apparatus, apparatus for the nitrification/denitrification of digested biosolids are provided. The apparatus includes a reactor adapted for nitrification/denitrification of digested biosolids. The apparatus also includes an aeration system at least partially within the reactor. The aeration system is adapted to supply an oxygen-containing fluid to the reactor. The apparatus also includes one or more nozzles at a top portion of the reactor adapted to spray digested biosolids into the reactor.

In another aspect of the present processes and apparatus, apparatus are provided for treating sludge resulting from wastewater treatment. The apparatus includes a digestion reactor and a nitrification/denitrification reactor fluidly connected to the digestion reactor. The apparatus also includes an aeration system at least partially within the nitrification/denitrification reactor and a controller operatively connected to the aeration system.

In another aspect of the present processes and apparatus, an apparatus is provided for the nitrification/denitrification of digested biosolids. The apparatus includes a reactor having an inlet for introducing digested biosolids. The apparatus also includes means for measuring one or more parameters selected from the group consisting of pH, temperature, and/or a parameter indicative of oxygen availability in the digested biosolids (for example, DO or ORP). The apparatus also includes means for adjusting the amount of oxygen available in the digested biosolids. Suitable means are described in this disclosure, and the means of adjusting is capable of increasing a supply of oxygen available in the digested biosolids sufficient to promote nitrification, and decreasing the supply of oxygen available in the digested biosolids sufficient to promote denitrification. Preferably the adjusting means is automated. The adjusting means can include a jet aeration system operatively connected to a controller.

In the processes and apparatus described herein, the aeration system can include a jet aeration device located at a bottom portion of the reactor. In the processes and apparatus described herein, it is preferable that at least one sensor is adapted to measure oxidation-reduction potential (ORP) and/or pH. More preferably, the present apparatus includes one or more sensors adapted to measure pH and ORP, and the sensor(s) are operatively connected to provide a pH signal and an ORP signal to a controller, which is adapted for adjusting the aeration system based upon the pH signal and the ORP signal.

In the present processes and apparatus, one or more nozzles may be located at a top portion of the reactor. The nozzles should be capable of and adapted for spraying digested biosolids into the reactor. The apparatus may include one or more off-gas outlets at a top portion of the reactor and/or one or more inlet air vents at a top portion (such as on the roof or sides) of the reactor. The vents should be adapted to introduce air to the reactor. The vents may be operatively connected to a controller, so that the amount of air introduced to the reactor by the vents can be automatically adjusted, preferably based on a measured parameter.

In the present processes and apparatus, a controller can be operatively connected to any of the sensors and to the aeration system, including any pumps or blowers employed in the aeration system. The controller can be adapted for adjusting the aeration system based upon a signal from the sensor.

In the processes and apparatus described herein, the sludge may be aerobically and/or thermophilically digested before nitrification and denitrification. The present apparatus can include a digestion reactor, which may be adapted for one or both of thermophilic digestion of sludge and aerobic digestion of sludge.

The present processes and apparatus can further include dewatering the conditioned biosolids and/or equipment or means for dewatering conditioned biosolids, such as concentrators, centrifuges, filters, or presses.

The present processes and apparatus are capable of reducing the concentration of one or more digestion byproducts in the digested biosolids. Digestion byproducts include (but are not limited to) ammonia, total solids, volatile solids, total chemical oxygen demand, soluble chemical oxygen demand, biopolymers, proteins, polysaccharides, and VFAs.

Additional aspects, advantages and embodiments of the present processes and apparatus may be discerned by reference to the following figures and detailed description. Of course the present apparatus and processes are not limited to the embodiments shown in the figures and detailed description which follow.

DETAILED DESCRIPTION OF THE INVENTION

Figure 1:
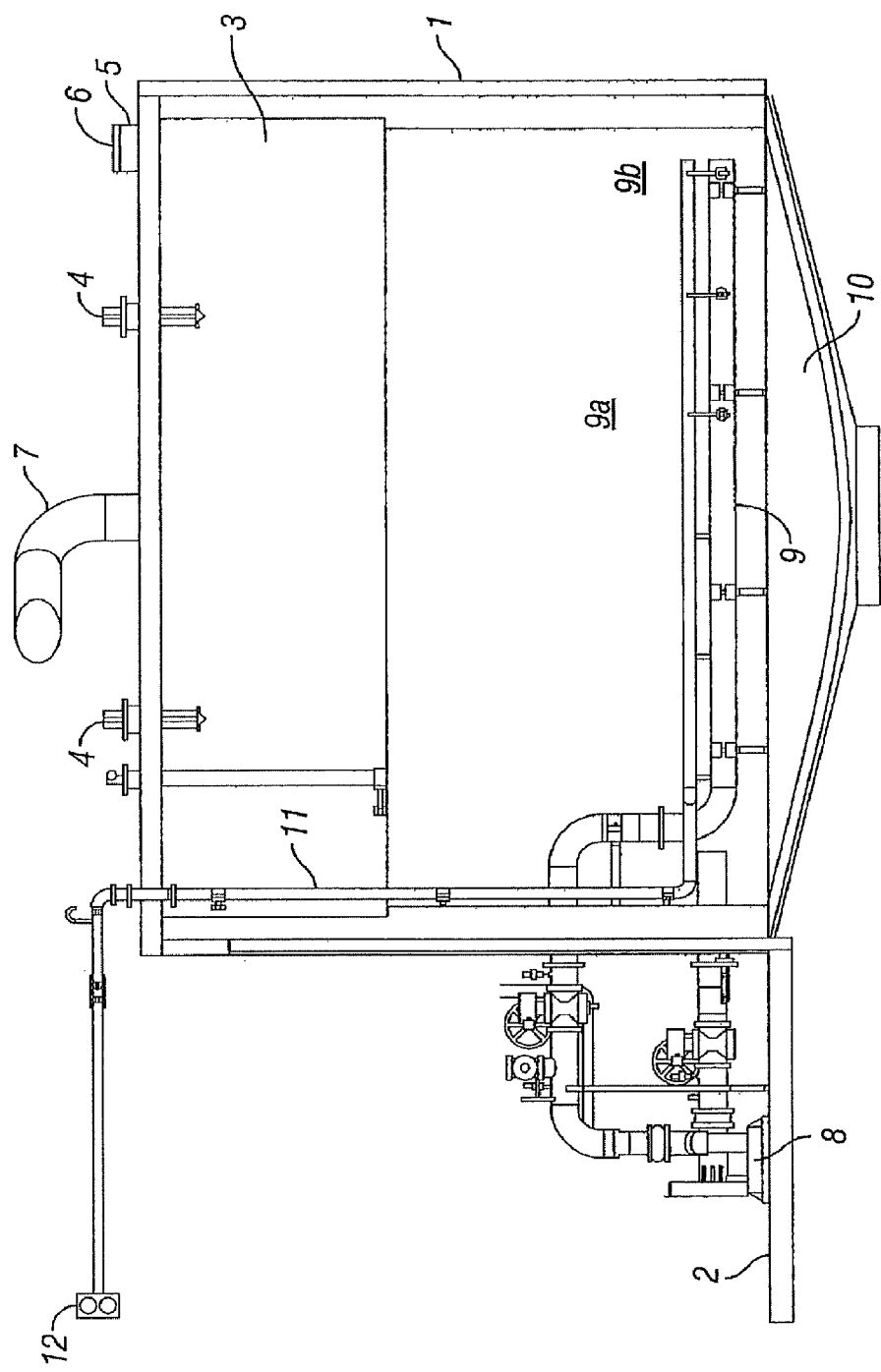
FIG. 1 is a cross-sectional view of a storage nitrification/denitrification reactor.

New processes and apparatus are provided for nitrification and denitrification of digested biosolids. The present processes and apparatus can be used for conditioning digested biosolids in a controllable and cost-efficient fashion. The present processes and apparatus are capable of alternating nitrification and denitrification phases in the same reactor. The present processes and apparatus may not need to rely on heat exchangers to reduce the temperature of the digested biosolids, and do not rely on the addition of alkaline compounds such as lime. The present processes and apparatus are capable of measuring one or more parameters relevant to conditioning the biosolids, such as pH, ORP, DO, temperature and/or others, and adjusting the mixing of oxygen-containing fluid with the biosolids. The present processes and apparatus may include adjusting the amount of free oxygen available for nitrification, such as by adjusting the mixing of the biosolids and an oxygen-containing fluid, thereby promoting nitrification or denitrification in the same reactor. The present processes and apparatus can be employed to cycle between nitrification and denitrification in a storage nitrification/denitrification reactor. Increasing the rate of flow and/or volume of the biosolids and/or oxygen-containing gas increases the rate of nitrification. During nitrification, alkalinity is consumed, and this is indicated by a decline in pH of the biosolids. When a lower pH set point is obtained, the rate of flow and/or volume of the biosolids and or oxygen-containing gas can be reduced, which will increase the rate of denitrification. The biosolids in turn gradually recover the alkalinity, indicated by an increase in pH. These steps can be repeated until the desired reduction of the amount of one or more byproducts of digestion (such as ammonia, total solids, volatile solids, total COD, or soluble COD) in the digested biosolids is obtained. In addition, the transfer of the thermophilically treated biosolids induces alkalinity not normally associated with mesophilically treated biosolids.

In some embodiments of the present processes and apparatus, a system is provided which automatically measures and controls the amount of oxygen available in the SNDR (or more particularly, in the contents of the SNDR). This system will typically include an ORP probe and/or a pH probe inside the reactor. The probe(s) measure the free oxygen available for nitrification/denitrification and/or the pH, and provide an ORP signal and/or a pH signal to a controller or a means for controlling or adjusting the oxygen available in the biosolids within the reactor. The system will typically include a means for automatically controlling a motive pump, or mixer that introduces or recirculates the biosolids into the reactor, and/or a blower that introduces air or another oxygen-containing gas into the reactor. In other embodiments, a physical property other than ORP or pH may be measured or monitored. Suitable means for automating the controlling or adjusting steps include a programmable logic controller (PLC), a proportional, integral, derivative (PID) controller, a programmable automation controller (PAC), a timer, an electromechanical relay, a microcontroller, a microprocessor, a computer, or one or more digital or analog signals. This automated controlling or adjusting means is operatively attached to the ORP probe and/or pH probe and the motive pump and/or air blower such that, based upon the amount of oxygen available, the automatic control means will cause the motive pump and/or the blower to adjust the flow of biosolids and/or oxygen-containing gas into the reactor. Biological reactions will cause the pH and/or the ORP of the biosolids in the reactor to adjust accordingly.

The present processes and apparatus can be employed for reducing the amount of digestion byproducts, such as ammonia COD, VFAs, and biopolymers. This in turn reduces the amount of chemical conditioners, such as ferric and/or alum, and polymers required during the dewatering operations. By controlling the amount of oxygen available in the reactor, and thereby controlling the nitrification/denitrification process, numerous process advantages result as well as a better digested and conditioned biosolids end product.

The present processes and apparatus can also be used to reduce and/or eliminate the need for external heat exchangers and cooling water to control and/or reduce the temperature of the storage nitrification/denitrification reactor. This in turn reduces the expense of and the amount of energy for treating the digested biosolids and nutrients returned to the wastewater treatment process.

In addition, the present processes and apparatus provide a method of pre-scrubbing the ammonia-laden off-gas from a digestion reactor before further treatment of off-gas, typically in a scrubber and/or biofilter. This reduces the concentration and/or mass loading introduced into the scrubber and/or biofilter.

The present processes and apparatus can be used to return beneficial nitrifying/denitrifying bacteria to the headworks to be reused in the aeration tanks, thereby continually reseeding the digestion tank with nitrifiers and denitrifiers, increasing the nitrifier and denitrifier microorganism ratio and reducing the amount of time needed in northern temperate climates for the initialization of the nitrification and denitrification processes.

The present processes and apparatus are extremely versatile and adaptable and may be tailored to individual applications. Different industrial plants have different digested biosolids product mixes with different sets of byproducts. The complexity of the organic chemistry can vary from short chain molecules that are readily broken down to long chain molecules that are more difficult to break down. The present processes and apparatus have the flexibility to operate at varying liquid depths, at varying retention times, and as single or multiple tank reactors.

The present processes and apparatus employ a nitrification/denitrification process for the post-digestion thermophilic treatment of biosolids in a SNDR. The present processes and apparatus can produce high quality biosolids and reduce the amounts of ammonia and other byproducts produced by the digestion process, while eliminating or reducing the need for cooling water and eliminating the need for addition of alkalinity. The typical SNDR is a post-digestion reactor in which nitrification and denitrification are cyclically promoted by monitoring and adjusting the amount of oxygen available in the digested biosolids, preferably by an automated control system.

Nitrification refers to the biological oxidation of ammonium with oxygen into nitrites and nitrates performed by nitrifying bacteria. This may be followed by the further oxidation of these nitrites into nitrates. Nitrification is also a step in the nitrogen cycle in soil, where the oxidation of ammonia into nitrite, and the subsequent oxidation to nitrate, can be performed by nitrifying bacteria.

Nitrification has been used for the removal of nitrogen compounds from municipal wastewater. Conventional removal processes have employed nitrification followed by denitrification. The cost of such processes resides mainly in aeration (bringing oxygen in the reactor) and the addition of an external carbon source (such as methanol) for the denitrification.

Nitrification is promoted by the increased availability of oxygen in an environment. Nitrification typically involves a process of oxidizing nitrogen compounds with oxygen (effectively, loss of electrons from the nitrogen atom to the oxygen atoms):

$$NH_3 + O_2 \rightarrow NO_2^- + 3H^+ + 2e^-$$

$$NO_2^- + H_2O \rightarrow NO_3^- + 2H^+ + 2e^-$$

Denitrification is the process of reducing nitrates and nitrites (gain of electrons), which are highly oxidized forms of nitrogen compounds, into gaseous nitrogen. The denitrification process can be performed by denitrifying bacteria. Denitrification and nitrification are biological processes of the nitrogen cycle that naturally occurs in soil and aqueous environments.

Denitrification is promoted when oxygen (which is a more favorable electron acceptor) is less available, and denitrifying bacteria turn to nitrate as an oxygen source for their respiration. Because the atmosphere is rich with oxygen, natural denitrification only takes place in some soils and groundwater, wetlands, poorly ventilated corners of the ocean, and in seafloor sediments in anoxic environments.

Denitrification proceeds through some combination of the following steps: nitrate→nitrite→nitric oxide→nitrous oxide→nitrogen gas. Denitrification can also be expressed as a redox reaction:

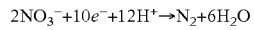
$$2NO_3^- + 10e^- + 12H^+ \rightarrow N_2 + 6H_2O$$

Denitrification is the second step in the nitrification/denitrification process, which has been used to remove nitrogen from sewage and municipal wastewater. In some wastewater treatment plants, small amounts of methanol are added to the wastewater to provide a carbon source for the denitrifying bacteria.

FIG. 1 is a cross-sectional view of an embodiment of the present SNDR apparatus. The digested biosolids from an earlier thermophilic biosolids treatment reactor, preferably a digestion reactor and typically an ATAD reactor, is transferred to the storage nitrification/denitrification reactor 1 by conduit 2. The biosolids are usually provided in a mixture of solids in liquid, typically as a mostly aqueous mixture of various soluble and insoluble components in water and other liquid components. The biosolids can be introduced into the reactor 1 by a suitable inlet. Preferably, the inlet is a nozzle adapted for spraying the biosolids, which is provided as a sprayable mixture. The digested biosolids are pumped into the headspace 3 of the storage nitrification/denitrification reactor 1 and may be sprayed using cooling nozzles 4. Air, or other oxygen-containing fluid, is introduced into the reactor 1 through vent hatches 5. The volume and/or flow of air introduced to the reactor 1 may be regulated using dampers 6 that can be opened and closed based upon the temperature in the SNDR 1. The air can be controlled by a PLC or other automatic controller. By spraying the biosolids into the headspace 3 of the reactor 1, heat transfer from the biosolids to the off-gas takes place in the headspace 3 of the SNDR 1. Preferably, the digested biosolids are sprayed into the reactor at a velocity in the range of from about 20 feet/second to about 50 feet/second. Off-gas leaves through an off-gas damper 7 carrying heat with it.

In the embodiment shown in FIG. 1, the SNDR 1 also includes an aeration system, such as a jet aeration system. The jet aeration system includes a jet aeration pump 8 for fluid circulation, a blower 12 or other equipment for pushing air or other oxygen containing gas, a jet aeration device 9 for mixing the liquid in the basin 10, and an air pipe 11 for introducing air or other oxygen containing gas into the jet aeration device. The jet aeration device 9 includes a liquid header 9a and an air header 9b. The jet aeration pump 8 pumps the digested biosolids through the liquid header 9a of the jet aeration device 9. Air or other oxygen-containing gas is introduced from outside the SNDR 1 through the air pipe 11 whose upstream end may be connected to one or more air blowers 12. The air pipe 11 transports the air or other oxygen-containing gas to the air header 9b. The air header 9b may be detached from or affixed to the liquid header 9a. The speed of the blowers 12 may be varied based on the residual oxygen content in the digested biosolids, thereby controlling the nitrification and denitrification process. That is, the availability of oxygen in the biosolids is measured and the amount of oxygen introduced to the reactor 1 is adjusted based on that measured parameter. To promote nitrification, the speed of the blowers 12 is increased. To promote denitrification, the speed of the blowers 12 is decreased, or the alternatively, the blowers 12 may be turned off. Examples of suitable aeration systems include jet aeration with blowers or aspirating air systems, mixers, coarse bubble aeration, and fine bubble aeration.

An ORP probe can be provided in the SNDR to measure an indication of the residual oxygen content in the digested biosolids, that is, to indicate the oxygen available for nitrification. A low ORP indicates that little or no oxygen is available for nitrification while a high ORP indicates that oxygen is available. When a higher ORP set point is reached, the blower speed can be reduced or stopped in order to promote denitrification. For example, the higher ORP set point can be in the range of +100 mV. When a lower ORP set point is reached, the blower speed can be increased to promote nitrification. Alternatively, or additionally, a pH probe can be installed in the SNDR 1 to measure an indication of the alkalinity of the digested biosolids. Alkalinity is consumed during nitrification, which is indicated by a lower pH value. When a lower pH set point is reached, the blower can be shut off or its speed reduced to promote denitrification. For example, the lower pH set point can be in the range of −200 mV. During denitrification, alkalinity is gradually recovered, which is indicated by a rise in the pH value. When an upper pH set point is obtained, the speed of the blower can resume. For example, the upper pH set point can be in the range of 6.7 to 7.0 depending on local water chemistry. Preferably the blower is turned on and off based on a measured pH, and the speed of the blower during a nitrification phase is adjusted based on measured ORP. It is desirable to adjust the speed of the blower to provide a gradual lowering of pH during the nitrification phase. This cycle of varying the blower speed depending on the residual oxygen in or the pH of the digested biosolids can be automated and controlled by a PLC or other automatic controller.

Figure 2:
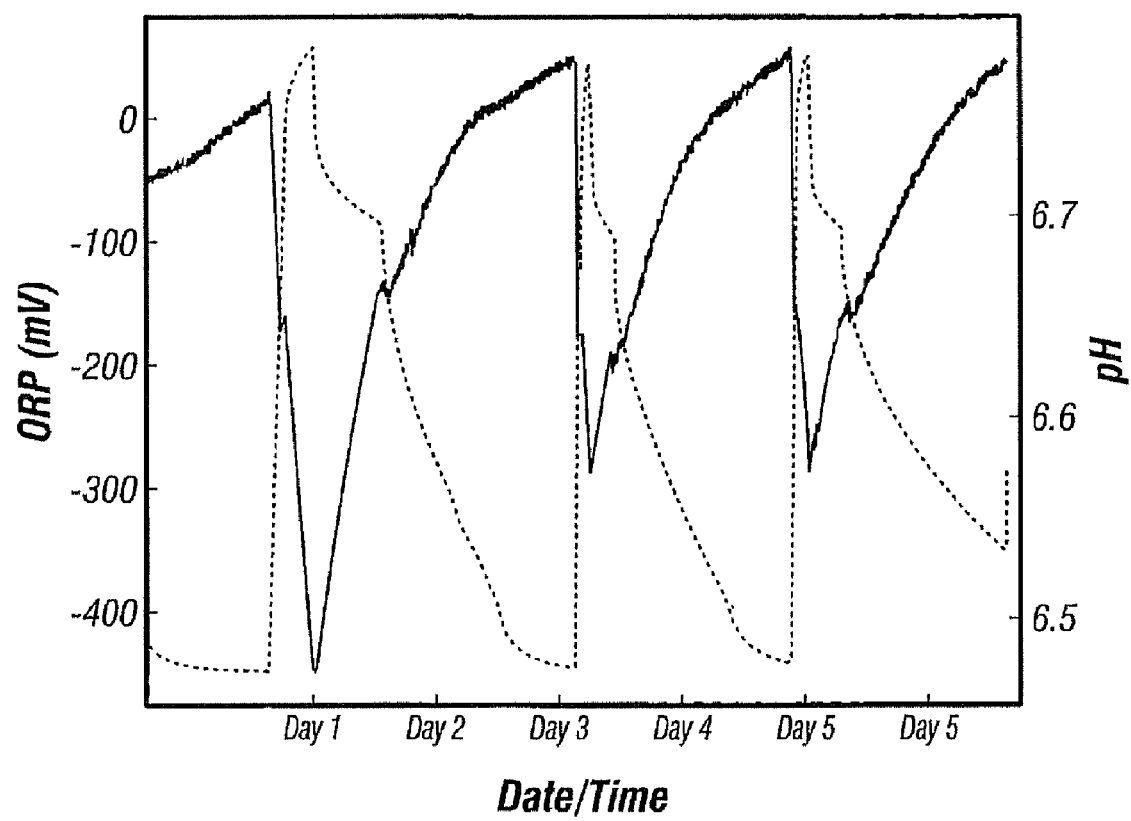
FIG. 2 is a graph of the pH and ORP of the digested biosolids in a storage nitrification/denitrification reactor over time.
Figure 3:
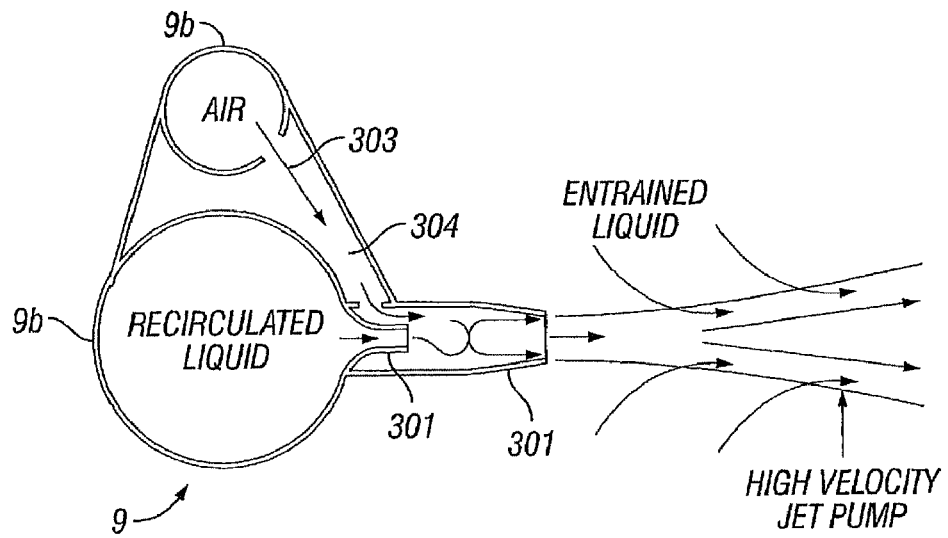
FIG. 3 is a cross-sectional view of a jet aeration device adapted for use in the storage nitrification/denitrification reactor.
Figure 4:
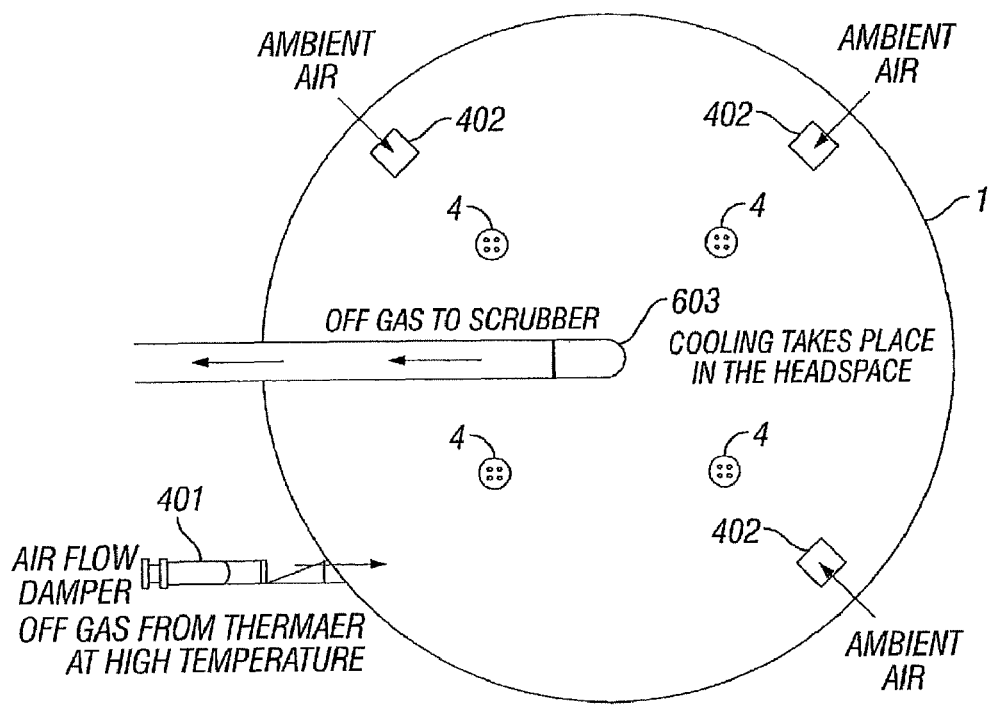
FIG. 4 depicts a top view of a storage nitrification/denitrification reactor.
Figure 5:
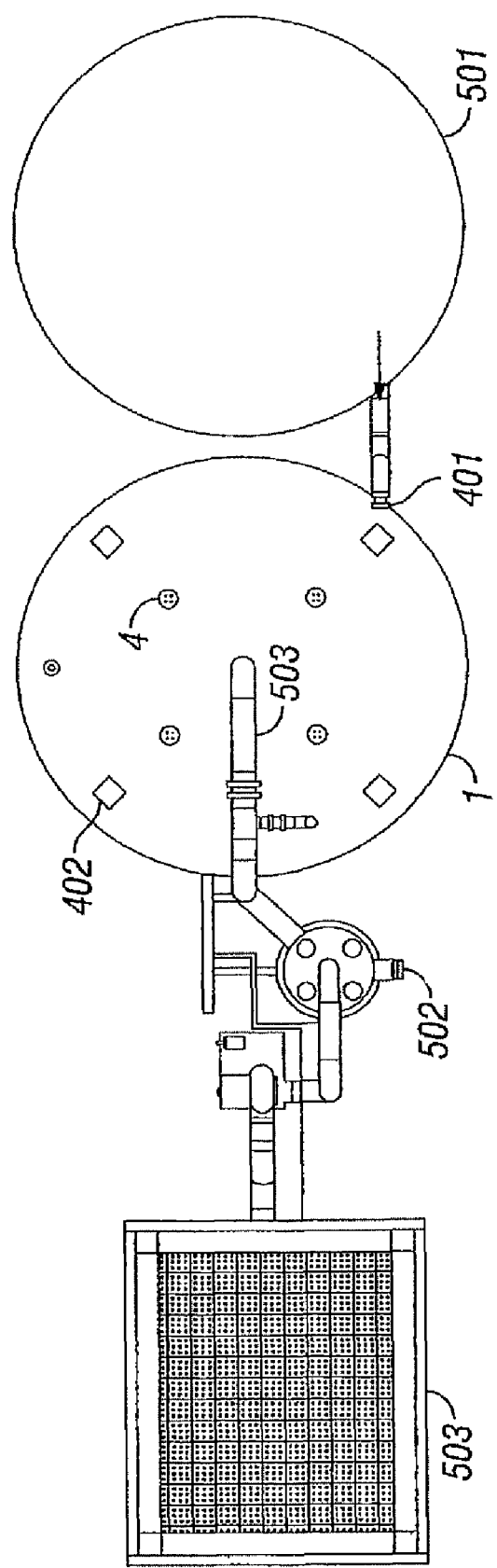
FIG. 5 shows the overall process flow of off-gas through a biosolids treatment system that includes a digestion reactor, a storage nitrification/denitrification reactor, a scrubber and a biofilter.
Figure 6:
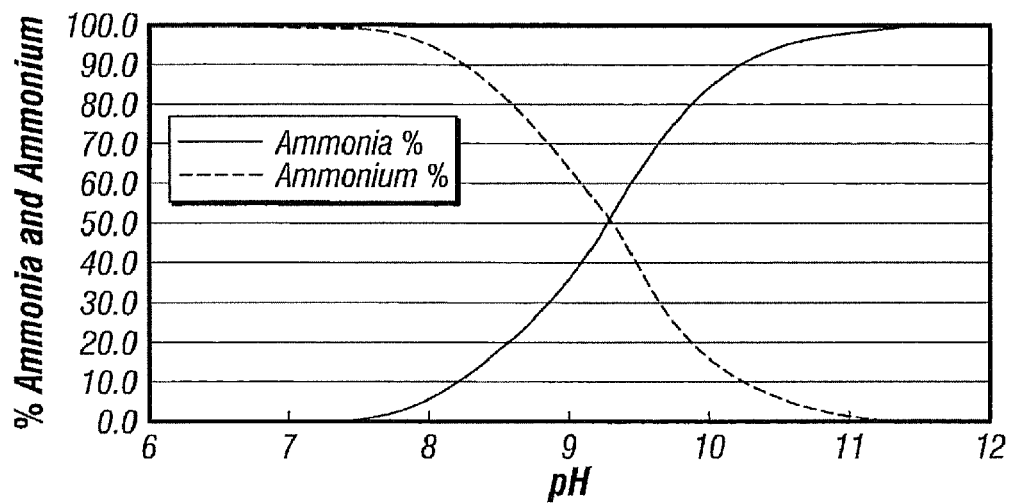
FIG. 6 is a graph illustrating the potential variation of ammonia and ammonium with pH using the present process and apparatus.

FIG. 2 illustrates the pH and ORP variation in an example of the present process. In this example, initially blowers are turned on to provide oxygen containing air to the digested biosolids in the reactor. In this phase, nitrification is promoted. When a lower pH set point is reached (about 6.5), the blower is turned off. In this phase, denitrification is promoted, and the measured pH begins to rise while the measured ORP begins to fall. FIG. 2 shows how pH and ORP vary in alternating phases of nitrification and denitrification over several days. FIG. 2 shows a cycling between nitrification and denitrification phases occurring in the same reactor. FIG. 2 shows process in which the nitrification and denitrification was controlled by adjusting the pH of and/or the oxygen in the digested biosolids overtime in a SNDR.

The present processes and apparatus can be employed to reduce the concentration of ammonium, VFAs, biopolymers, total solids, and volatile solids. Table 1 shows contemplated reductions of these digestion byproducts when using the present processes of controlling nitrification/denitrification.

TABLE 1

| Process Parameters | Incremental Reduction |
|---|---|
| Total Solids | 15-25% |
| Volatile Solids | 20-30% |
| Ammonium | 40-80% |
| Total COD | 10-25% |
| Soluble COD | 30-60% |

These process parameters can be measured using standard methods in the field, such as methods described in "Standard Methods for Examination of Water and Wastewater."

The present processes and apparatus may employ a cooling nozzle. FIG. 1 shows a cooling nozzle 4. Spraying the digested biosolids into the SNDR through the cooling nozzle 4 provides several advantages. For example, the temperature of the digested biosolids is reduced, preferably to about 35 degrees Celsius, through direct contact of the biosolids droplets with ambient air or other oxygen-containing gas in the headspace of the reactor. Higher velocity at the tip of the nozzle increases the diameter of the spray circle and reduces the particle size of the biosolids to enhance direct contact between the biosolids and the air. In addition, the higher velocities assist in intense mixing of the air particles with the biosolids droplets discharged through the nozzle.

Table 2 shows the expected heat transfer using this cooling process given these particular design conditions. Approximately 350,000 BTUs/hr of heat can be removed from 550 (Standard Cubic Feet per Minute) SCFM of air using the present processes and apparatus.

TABLE 2

| Tank | Air Flow CFM | Temperature ° F. | Net heat through Off Gas BTUs/Hour |
|---|---|---|---|
| Heat Influx From Treatment Reactor (RH 100%) | 572 | 150 | 453,838 |
| Through Blower (Dry RH ~10%) | 166 | 190.9 | 47,868 |
| Dilution Air (RH 60%) | 6,942 | 85 | 1,086,991 |
| Heat Out flux Storage (RH 100%) | 7680 | 95 | 1,938,428 |
| Total Net BTUs | | | −349,731 |

FIG. 3 shows a cross-sectional view of an example of a jet aeration device 9. The device includes a liquid header **9*a* and an air header 9*b*. The liquid header 9*a* and the air header 9*b* may be longitudinal, circular, or radial in shape. The liquid header 9*a* transports a liquid, such as the digested biosolids solution. The liquid header 9*a* has a relatively small opening or inner nozzle 301, which allows liquid to exit from the liquid header 9*a* into an outer nozzle 302. The air header 9*b* also has an air header opening 303, which allows the gas to exit through an air passageway 304 into the same outer nozzle 302. In the outer nozzle 302, the gas and the liquid mix so as to create a shear that increases oxygen transfer to induce the nitrification process. The air header 9*b*** carries an oxygen-containing gas into the digested biosolids for the nitrification process. Typically, the source for the oxygen-containing gas is ambient air from outside the SNDR; however, the gas may be obtained from any source that will provide sufficient oxygen for the nitrification process.

The jet aeration device 9 has the ability to transfer a high amount of oxygen-containing gas into a solution with high suspended solids concentration while thoroughly mixing the reactor contents. When the solution is mixing, a shear is produced.

FIG. 4 is a top view of a storage nitrification/denitrification reactor. The off-gas from an earlier biosolids treatment reactor, such as an ATAD reactor, enters from one end 401 of the storage nitrification/denitrification reactor 1 while vents 402 are placed at different positions, preferably radially, on the reactor 1. An oxygen-containing gas, usually ambient air, is introduced to the storage nitrification/denitrification reactor 1 through vents 402. Cooling nozzles 4 are placed at different positions on the inside of the storage nitrification/denitrification reactor 1 so that the enthalpy content of the air entering through the vents 402 is raised through direct contact between the air and the digested biosolids sprayed using the cooling nozzles 4. The cooling nozzles 4 are preferably placed radially around the inside of the storage nitrification/denitrification reactor 1. The heat transfer from the digested biosolids to the off-gas takes place in the headspace of the storage nitrification/denitrification reactor 1. Off-gas leaves through the off-gas piping 403, typically located in the center of the storage nitrification/denitrification reactor. The off-gas carries heat with it, thereby transferring heat from the digested biosolids and lowering its temperature reducing or eliminating the use of an external heat exchanger.

The present processes and apparatus can be employed to automatically adjust or maintain the temperature of the biosolids in the SNDR. Preferably, the biosolids are at a temperature in the range of from about 32 degrees Celsius (about 90 degrees Fahrenheit) to about 38 degrees Celsius (about 100 degrees Fahrenheit), more preferably about 35 to about 38 degrees Celsius. In the present processes and apparatus, the controller can be configured so that the aeration system, the nozzles, and/or the vents are adjusted in order to adjust the temperature of the biosolids in the reactor. That is, one or more of the introduction of air through vents, the introduction of biosolids through the nozzles, or the operation of the aeration system may be adjusted to increase or decrease the temperature in the reactor. Preferably the external airflow can be adjusted based on a measured parameter, such as temperature.

FIG. 5 shows the overall process flow of off-gas through an embodiment of the present process and apparatus. Off-gas from a digestion reactor, such as an autothermal thermophilic aerobic digestion (ATAD) reactor 501, enters the storage nitrification/denitrification reactor 1 from one end 401 while inlet vents 402 are shown placed at different positions on the storage nitrification/denitrification reactor 1. The cooling nozzles 4 are disposed inside the storage nitrification/denitrification reactor 1. Heat from the digested biosolids is transferred to the off-gas in the headspace of the SNDR 1. The off-gas from the SNDR 1 leaves through the off-gas piping 403, and is further processed through a scrubber 502 and/or biofilter 503. Scrubbers are commonly used to reduce odors from off-gases. Suitable scrubbers include particulate scrubbers as well as adsorption towers which are widely used in the chemical and metal working industries. Biofilters use naturally occurring bacteria to oxidize the odor constituents into products like carbon dioxide and water. Biofilters are commonly used by wastewater treatment plants to reduce odors.

Varying concentrations of ammonia have been observed ranging from about 700 ppm to about 1500 ppm in the off-gas from the ATAD 501. The present processes and apparatus provide a way to address the problem of high ammonia in off-gas from an ATAD reactor. By transferring off-gas from the ATAD reactor to a storage nitrification/denitrification reactor, the amount of ammonia in the off-gas can be reduced together with the reduction of ammonia in the digested biosolids.

In the present disclosure, any discussion of ammonia or ammonium refers to both free ammonia ($NH_3$) and ammonium ($NH_4^+$) unless the context of the discussion indicates otherwise. This is appropriate since the present processes and apparatus are useful for reducing the amount of both ammonia and ammonium in digested biosolids. Indeed, there is an equilibrium between ammonia and ammonium in an aqueous solution, as shown by the following equation:

$$NH_4^+ \rightarrow NH_3 + H^+ \ pK_a = 9.26 @ 20° \text{ C.}$$

FIG. 6 illustrates the variation of ammonia and ammonium with pH. In a more acidic environment (lower pH), higher concentrations of H+ ions will cause this reaction to shift toward the left, resulting in a higher concentration of $NH_4^+$. In a more basic environment (higher pH), the concentration of H+ will be lower, causing the reaction to shift toward the right, producing higher concentrations of free ammonia ($NH_3$), which can be released into the off-gas.

The high temperature in the ATAD causes the $pK_a$ to be lower and with the relatively high pH values (approximately 8-8.5) causes the ammonium in the ATAD to evolve into the gaseous phase. This is transferred to the off-gas within the SNDR. The lower temperatures in the SNDR increase the $pK_a$ of the ammonia as well as the lower pH due to the nitrification process and this repartitions the ammonia from the gaseous phase to ammonium in the aqueous phase. The fine mist of the digested biosolids produced by the cooling nozzles 4 further humidifies the mixed air. Introduction of air or other oxygen-containing gas through the vents 402 disperses both the heat and the remaining ammonia concentration over a large volume of air going to the scrubber 502 and/or biofilter 503. The heat and any residual gaseous ammonia leave the SNDR 1 through the off-gas piping 403 and flow to the scrubber 502 and/or biofilter for further treatment.

Figure 7:
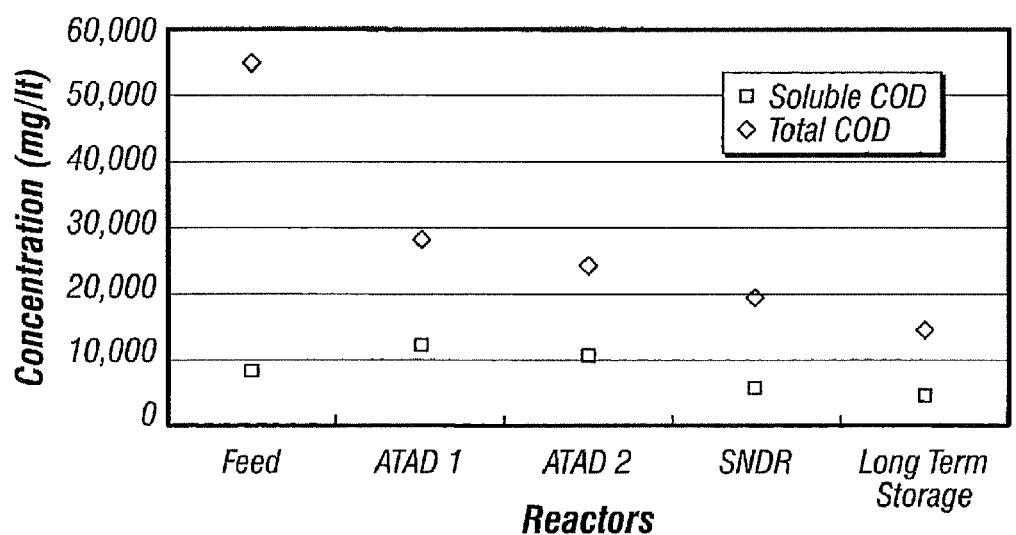
FIG. 7 is a graph illustrating the potential chemical oxygen demand (COD) reduction using the present process and apparatus.

The present processes and apparatus may be employed to reduce the amount of VFAs, biopolymers, ammonia, total solids, and volatile solids. One embodiment of the present apparatus comprises two thermophilic digestion tanks operated in parallel (ATADs 1 and 2), followed by a storage nitrification/denitrification reactor (SNDR) and a long term storage tank. A thickened (but fluid) biosolids mixture was fed into Tank 1 and Tank 2 operated at thermophilic temperatures. Total COD and Soluble COD at different stages were measured and recorded. FIG. 7 shows a representative variation of total COD and soluble COD within the different tanks. Both the concentration of total COD and soluble COD were reduced by operation of the storage nitrification/denitrification reactor according to the present process (SNDR).

Figure 8:
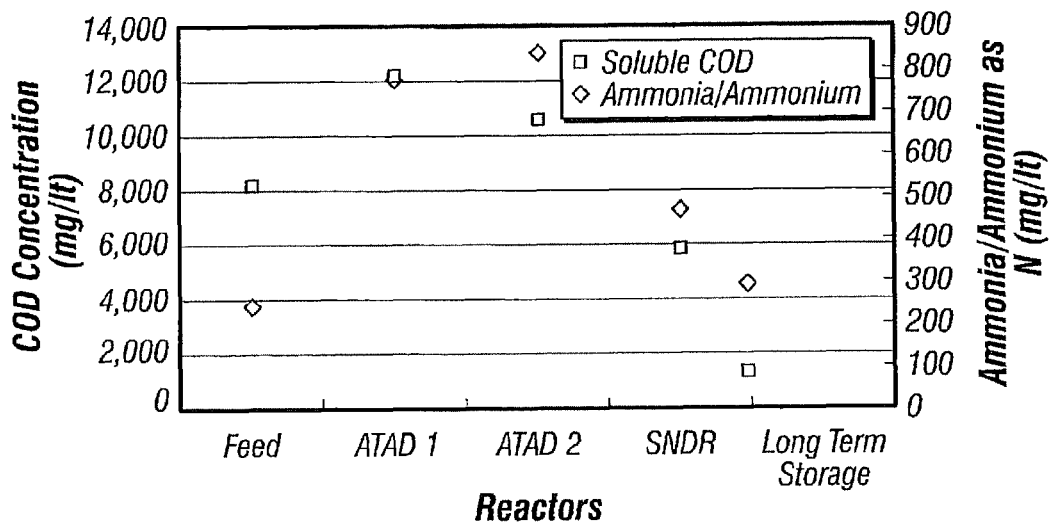
FIG. 8 is a graph illustrating the potential reduction of ammonia/ammonium and COD using the present process and apparatus.

In addition to total COD and soluble COD, ammonium concentration was also recorded. The concentration of ammonium in the incoming feed was less than 200 mg/L. As a result of digestion, nitrogen (contained within the mesophilic bacterium) remains as a byproduct and is released into the biosolids in the digestion tanks, resulting in an ammonium concentration in the range of about 700 to about 1000 mg/L in the digestion tanks. The conditioning of the digested biosolids in the SNDR can reduce the concentration of ammonium to less than 200 mg/L. Reductions in the concentration of ammonium as high as 70% were observed without the addition of an alkaline composition. FIG. 8 shows the concentration of ammonium in ATADs 1 and 2, the SNDR and the long term storage tank. Ammonia and ammonium concentrations were reduced by operation of the SNDR.

Figure 9:
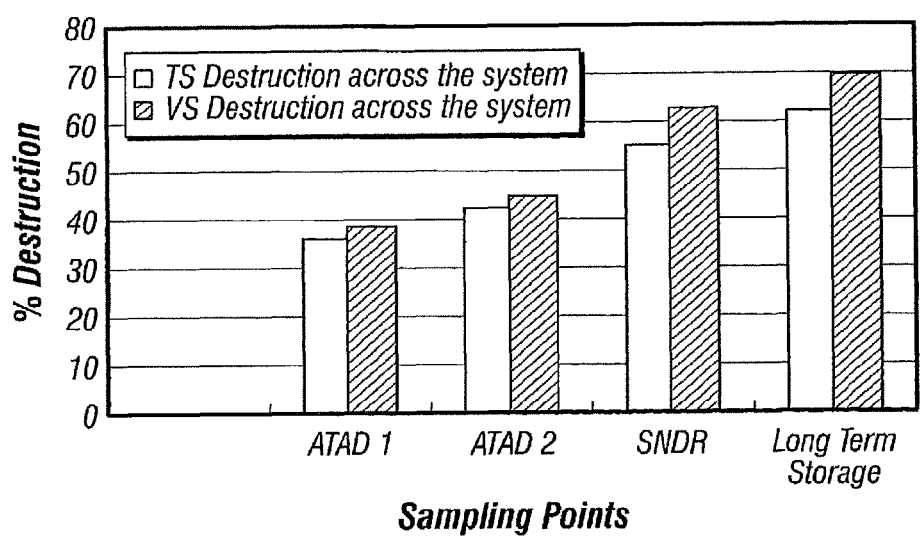
FIG. 9 is a graph illustrating the potential TS and VS destruction using the present process and apparatus.

The present processes and apparatus may also be employed to induce additional total solids (TS) and volatile solids (VS) destruction in the digested biosolids. VS reduction as high as about 10-15% has been observed with proper control over aeration, mixing, temperature, and pH. Additional VS destruction reduces oxidative demand and soluble COD fraction and translates into lower odor potential and vector attraction in the digested biosolids. FIG. 9 shows the TS and VS reduction in the various tanks. Both the concentrations of TS and VS were reduced by operation of the SNDR.

In the present specification, use of the singular includes the plural except where specifically indicated. In the present specification, any of the functions recited herein may be performed by one or more means for performing such functions. The present apparatus and methods may include various means for performing one or more of the steps or actions described in this specification. It is expressly contemplated and disclosed that the present specification provides a written description for claims comprising such means.

All patents, test procedures, and other documents cited herein are fully incorporated by reference to the extent such disclosure is not inconsistent with this invention and for all jurisdictions in which such incorporation is permitted.

While the present invention has been described and illustrated by reference to particular embodiments, it will be appreciated by those skilled in the art that the invention lends itself to many different variations not illustrated herein. The various aspects disclosed herein may be used alone or in combination. The invention is not limited to the specific examples presented herein, including the drawings. Numerous variations are possible, and may be evident to persons working in the relevant art, all of which are considered to fall within the purview of the invention.

The invention claimed is:

1. A process for treating biosolids comprising:
treating biosolids by autothermal thermophilic aerobic digestion to produce digested biosolids;
subsequent to the digestion treating step, mixing the digested biosolids in a storage reactor with an oxygen-containing fluid, wherein the digested biosolids comprise one or more digestion byproducts;
measuring one or more measured parameters selected from the group consisting of
pH,
temperature, and
an oxygen availability parameter indicative of oxygen availability in the digested biosolids;
adjusting the mixing of the digested biosolids with the oxygen-containing fluid to promote nitrification and denitrification of the biosolids in the storage reactor, based on the measured parameter; and
reducing an amount of one or more digestion byproducts in the digested biosolids.

2. A process for treating biosolids so as to reduce one or more byproducts of digestion, the process comprising:
treating biosolids by autothermal thermophilic aerobic digestion reactor to produce digested biosolids;
subsequent to the digestion treating step, introducing the digested biosolids to a storage nitrification/denitrification reactor;
providing an oxygen content in the digested biosolids in the storage reactor to promote nitrification of ammonium within the biosolids in the storage nitrification/denitrification reactor, wherein the oxygen content is provided by a jet aeration device located at a bottom portion of the reactor; and
adjusting the oxygen content in the storage reactor to promote denitrification of nitrates and nitrites within the biosolids in the storage nitrification/denitrification reactor by adjusting the jet aeration device; and
reducing an amount of one or more digestion byproducts in the digested biosolids.

3. The process of claim 1, wherein oxygen availability of the biosolids is cycled one or more times between a nitrification level and a denitrification level.

4. The process of claim 1, wherein the measuring step comprises continuously monitoring the oxidation-reduction potential, or the dissolved oxygen, or both, of the digested biosolids.

5. The process of claim 1, wherein the measuring step comprises continuously monitoring the pH of the digested biosolids.

6. The process of claim 1, wherein the adjusting step is automated.

7. The process of claim 1, wherein the digested biosolids are sprayed into a nitrification/denitrification reactor at a velocity in the range of from about 20 feet/second to about 50 feet/second.

8. The process of claim 1, wherein the digested biosolids are subject to nitrification and denitrification without addition of an alkaline composition.

9. The process of claim 1 wherein the adjusting step comprises increasing the supply of oxygen-containing fluid to promote nitrification of the digested biosolids.

10. The process of claim 9 wherein the supply of oxygen-containing fluid is increased when an upper pH threshold or a lower ORP threshold is detected as the measured parameter.

11. The process of claim 10, wherein the upper pH threshold is in the range of about 6.7 to approximately 7.2.

12. The process of claim 1, wherein the adjusting step comprises decreasing the supply of oxygen-containing fluid to promote denitrification of the digested biosolids.

13. The process of claim 12 wherein the supply of oxygen-containing fluid is decreased when a lower pH threshold or a higher ORP threshold is detected.

14. The process of claim 13 wherein the lower pH threshold is in the range of about 6.4 to about 6.8.

15. An apparatus for the nitrification/denitrification of digested biosolids comprising:
    (a) a nitrification/denitrification reactor adapted for alternating nitrification and denitrification of digested biosolids in the same reactor;
    (b) one or more sensors adapted to measure one or more parameters of contents of the nitrification/denitrification reactor, and said one or more parameters are selected from the group consisting of pH, ORP, dissolved oxygen, temperature, and/or a parameter indicative of oxygen availability of the digested biosolids;
    (c) an aeration system at least partially within the nitrification/denitrification reactor adapted to supply an oxygen-containing fluid to the nitrification/denitrification reactor, wherein the aeration system comprises a jet aeration device located at a bottom portion of the reactor; and
    (d) a controller operatively connected to the sensor and to the aeration system, wherein the controller is adapted for adjusting the aeration system based upon a signal from the sensor.

16. The apparatus of claim 15, comprising at least one sensor adapted to measure oxidation-reduction potential (ORP) or dissolved oxygen (DO).

17. The apparatus of claim 15, comprising at least one sensor adapted to measure pH.

18. The apparatus of claim 15, comprising one or more sensors are adapted to measure pH and ORP,
    wherein said one or more sensors are operatively connected to provide a pH signal and an ORP signal to the controller, and
    wherein the controller is adapted for adjusting the aeration system based upon the pH signal and the ORP signal.

19. The apparatus of claim 15 further comprising one or more nozzles at a top portion of the reactor, wherein the nozzles are adapted for spraying the digested biosolids into the reactor.

20. The apparatus of claim 15, further comprising an autothermal thermophilic aerobic digestion reactor fluidly connected to the nitrification/denitrification reactor.

21. The process of claim 1, wherein the step of reducing an amount of one or more digestion byproducts provides conditioned biosolids, and the process further comprises the step of dewatering the conditioned biosolids.

22. The process of claim 2, wherein the storage nitrification/denitrification reactor comprises nitrifying bacteria and denitrifying bacteria, and the process further comprises the step of returning nitrifying/denitrifying bacteria to the autothermal thermophilic aerobic digestion reactor.

* * * * *